(12) United States Patent
Kimes

(10) Patent No.: US 8,986,157 B2
(45) Date of Patent: Mar. 24, 2015

(54) OVERRUNNING CLUTCH REACTING A FORCE PRODUCED BY A HYDRAULICALLY ACTUATED FRICTION BRAKE

(75) Inventor: John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2093 days.

(21) Appl. No.: 12/048,511

(22) Filed: Mar. 14, 2008

(65) Prior Publication Data
US 2009/0233755 A1 Sep. 17, 2009

(51) Int. Cl.
  *F16H 57/08* (2006.01)
  *F16D 41/12* (2006.01)
  *F16H 63/30* (2006.01)

(52) U.S. Cl.
  CPC .............. *F16D 41/12* (2013.01); *F16H 57/082* (2013.01); *F16H 63/3026* (2013.01)
  USPC ........................................................ 475/324

(58) Field of Classification Search
  CPC ........ F16H 57/08; F16H 57/082; F16D 41/12
  USPC ......... 475/324, 326–328, 281, 285, 287, 292, 475/297; 192/12 B, 18 A, 46
  See application file for complete search history.

(56) References Cited

U.S. PATENT DOCUMENTS

| | | | |
|---|---|---|---|
| 4,714,146 A | 12/1987 | Moroto et al. | |
| 5,495,778 A * | 3/1996 | Mochizuki | 74/606 R |
| 5,511,642 A * | 4/1996 | Klotz et al. | 192/45 |
| 6,039,160 A | 3/2000 | Joppeck | |
| 6,332,520 B1 | 12/2001 | Costin | |
| 6,481,551 B1 | 11/2002 | Ruth | |
| 6,557,682 B2 | 5/2003 | Imamura | |
| 6,953,412 B2 | 10/2005 | Braford et al. | |
| 7,100,756 B2 | 9/2006 | Kimes et al. | |
| 7,223,198 B2 | 5/2007 | Kimes et al. | |
| 2001/0006920 A1 * | 7/2001 | Park | 475/285 |
| 2006/0025279 A1 * | 2/2006 | Kimes et al. | 475/324 |
| 2006/0249345 A1 | 11/2006 | Ruth | |
| 2007/0062775 A1 | 3/2007 | Bird et al. | |

* cited by examiner

Primary Examiner — Roger Pang
(74) Attorney, Agent, or Firm — James Dottavio; MacMillan, Sobanski & Todd, LLC

(57) ABSTRACT

An assembly for an automatic transmission includes a casing, a carrier of a planetary gear set, a hydraulically actuated brake that driveably connects the carrier and the casing mutually when the brake is engaged in reverse drive and disconnects the carrier from the casing when the brake is disengaged in forward drive, and an overrunning clutch including an outer race driveably connected to the casing, an inner race driveably connected to the carrier, and multiple rockers carried on the inner race that pivot toward engagement with the cam surfaces, contact of the clutch with the casing providing a reaction to a force tending to engage the brake.

14 Claims, 2 Drawing Sheets

OVERRUNNING CLUTCH REACTING A FORCE PRODUCED BY A HYDRAULICALLY ACTUATED FRICTION BRAKE

BACKGROUND OF THE INVENTION

1. Field of the Invention

The invention relates in general to a clutch that produces a drive connection between components when their relative rotation is in one direction, and overruns when relative rotation is in the opposite direction. In particular, the invention pertains to using such clutches to provide a reaction to a force that actuates a friction clutch.

2. Description of the Prior Art

Conventional one-way clutches for producing a one-way drive connection between inner and outer races of the clutch include sprags or rollers for releasably driveably connecting the races and the components of a mechanical assembly connected to the races. Such clutches are commonly used in the powertrain or driveline of an automotive vehicle. One-way clutches perform satisfactorily in many cases, but certain applications, such as those in which large magnitudes of torque are transmitted by the clutch, or those that provide only a small space for the clutch, require one-way clutches other than conventional sprag-type or roller-type clutch to meet desire requirements.

Conventional one-way clutch assemblies have at least one sprag or roller, which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

Conventional one-way clutches develop relatively large magnitudes of hoop stress in the races when torque is transmitted through the clutch; therefore, the races of conventional one-way clutches are formed of bearing grade steel in order to withstand the operating hoop stress. Because the clutches develop relative low operating hoop stresses in service, those clutch can be formed of powdered metal. Clutches formed for powdered metal potentially can be produced at relative low cost compared to the cost to form and produce a conventional clutch of high grade steel, provided extensive machining is avoided.

A need exits for a low cost, reliable one-way clutch that produces low operating bearing stresses, is able to be formed readily from powdered metal, and can react the actuating force produced in a hydraulically actuated friction brake. The clutch should occupy little space, minimize in-service noise, and require little or no machining. Preferably, the desired clutch should include features that facilitate its assembly in a drive system.

SUMMARY OF THE INVENTION

An assembly for an automatic transmission includes a casing, a carrier of a planetary gear set, a hydraulically actuated brake that driveably connects the carrier and the casing mutually when the brake is engaged in reverse drive and disconnects the carrier from the casing when the brake is disengaged in forward drive, and an overrunning clutch including an outer race driveably connected to the casing, an inner race driveably connected to the carrier, and multiple rockers carried on the inner race that pivot toward engagement with the cam surfaces, contact of the clutch with the casing providing a reaction to a force tending to engage the brake.

The outer race of the overrunning clutch 20 always floats while the clutch is overrunning when the transmission produces forward drive, so that the outer race can find its centerline. The clutch resists or reacts the actuating force transmitted by a piston of the reverse brake to the friction discs and plates 90 of the reverse brake. It is acceptable that clutch 20 react the pressure force applied to the reverse brake because in reverse drive, the clutch is not overrunning, there is no relative movement between its inner and outer races, and no wear is produced between races.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
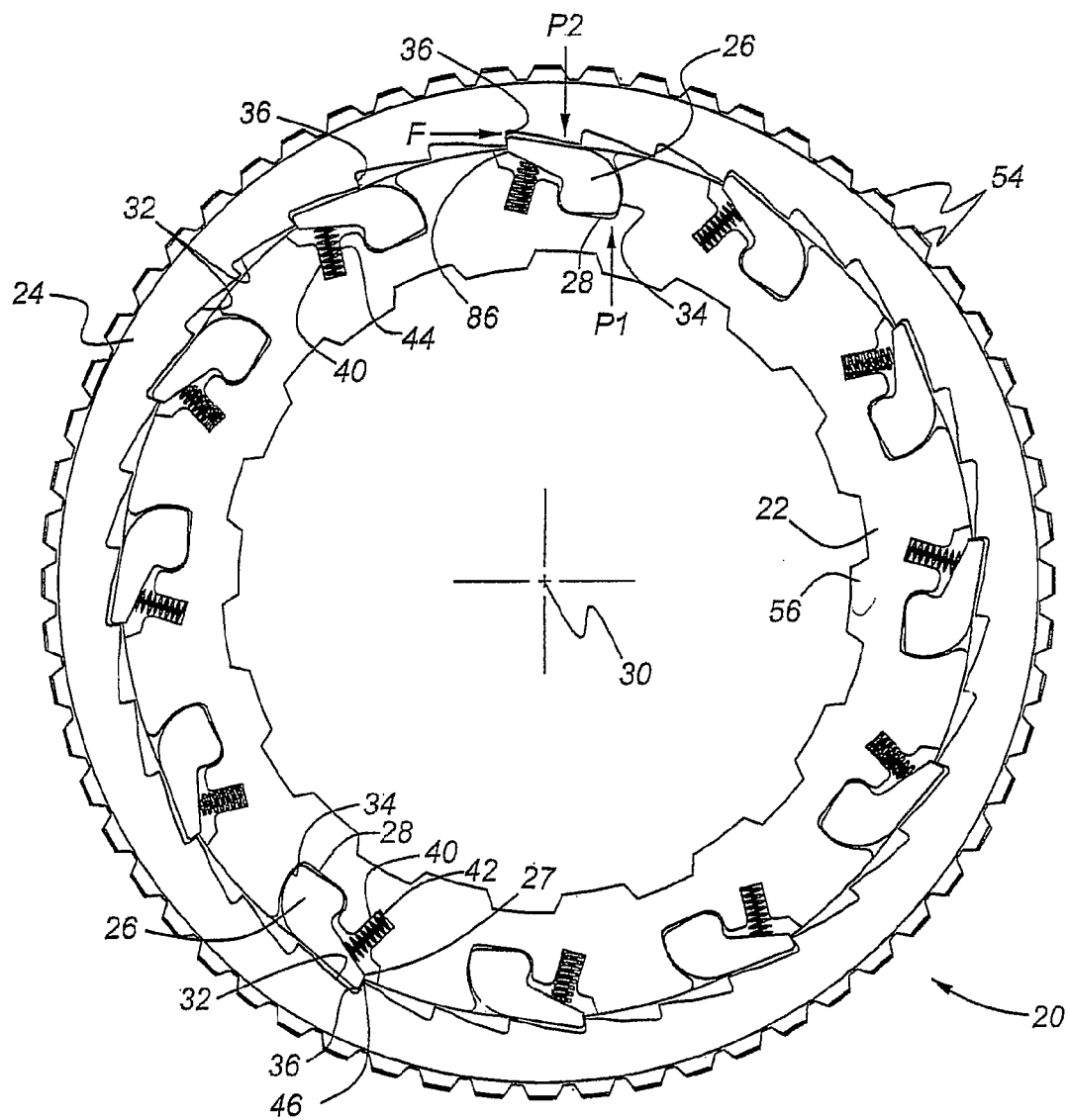
FIG. 1 is an end view of a one-way clutch showing rockers located in an inner race and engaged with notches in an outer race.

Referring now to the drawings, there is illustrated in FIG. 1 a one-way clutch assembly 20, which includes an inner race or rocker plate 22, an outer race or cam plate 24, and a plurality of rockers 26, each rocker being located in a pocket 28 formed in the inner race 22 and angularly spaced mutually about a central axis 30. The inner periphery of the outer race 24 is formed with a plurality of cams or notches 32 angularly spaced mutually about axis 30. There are twelve rockers 26 and pockets 28 and thirty-six notches 32 in the clutch illustrated in FIG. 1.

When the inner race 22 rotates clockwise faster than the outer race 24, each rocker 26 pivots counterclockwise in its pocket 28 away from engagement with the notches 32 due to contact of the rockers with the inner surface of the outer race. This allows the inner race 22 to rotate freely, i.e., to overrun clockwise about axis 30 relative to the outer race 24. When the inner race 22 attempts to rotate counterclockwise relative to the outer race 24, the inner race and outer race are engaged or driveably connected mutually by engagement of the rockers 26 with the notches 32.

When the clutch 20 is engaged, each engaged rocker 26 transmits a force F between the inner and outer races 22, 24 due to surface 27 of the rocker contacting the radially directed surface 36 of the engaged notch 32 and the rocker contacting the inner surface 34 of the pocket 28.

A recess 40, located at each pocket 28, contains a spring, such as a helical coiled compression spring 42 or an accordion compression spring 44, for urging each rocker to pivot in its pocket toward engagement with the notches.

When clutch 20 overruns, a force P2 is applied to each rocker 26 as it passes over the crest 46 of the radial surfaces 36 of each notches 32. Torque about center 30 produced by force F is reacted by a force P1 where rocker contacts the inner surface 34 of the pocket 28.

The outer surface of the outer race 24 is formed with spline teeth 54, by which race 24 can be driveably connected to a transmission casing. The inner surface of the inner race 22 is formed with spline teeth 56, by which race 22 can be driveably connected to a component of a transmission.

Figure 2:
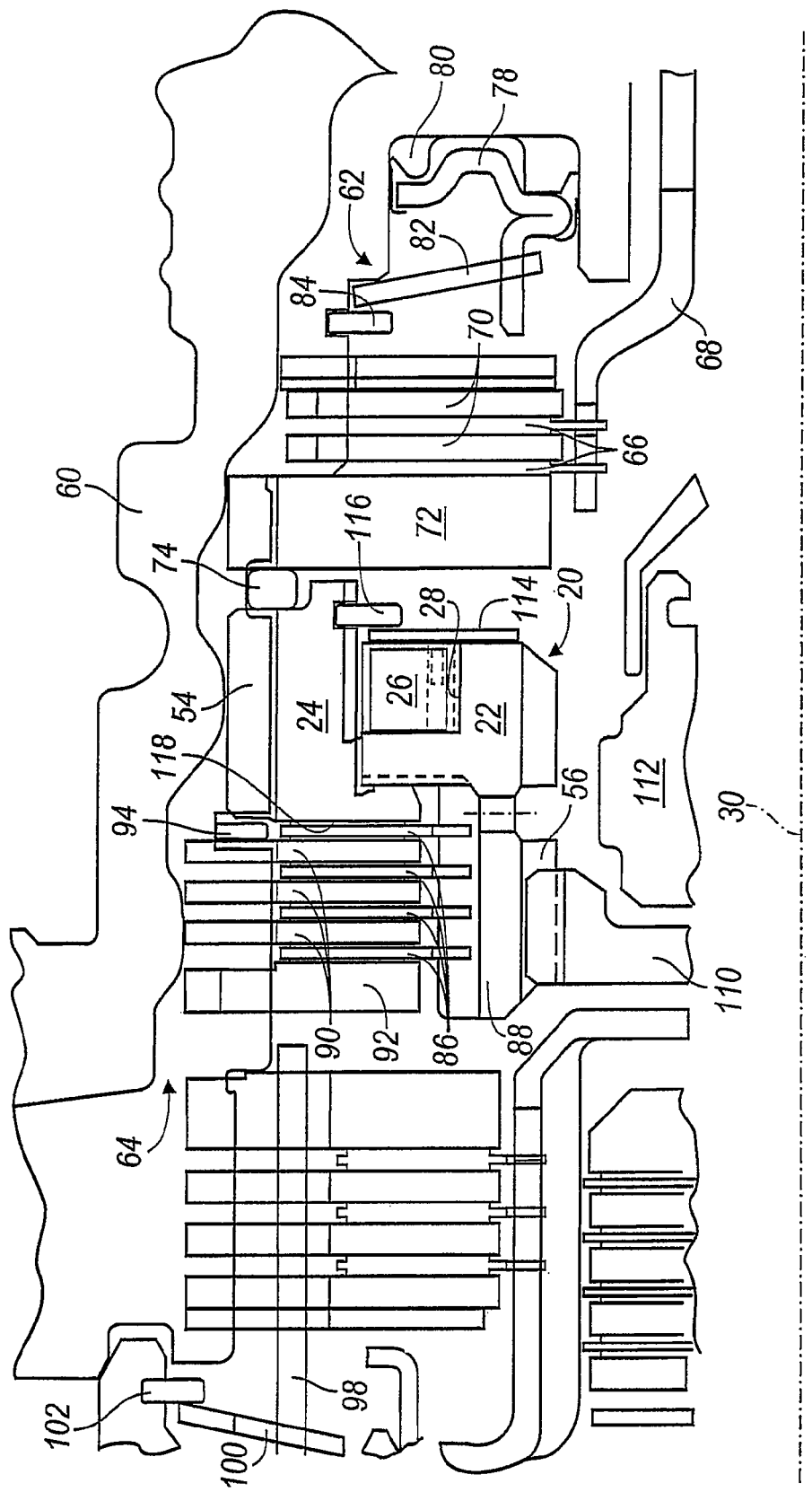
FIG. 2 is a cross sectional view showing the clutch of FIG. 1 located axially between two hydraulically actuated friction brakes.

FIG. 2 illustrates a one-way or overrunning clutch 20 located in a transmission case 60 between a hydraulically actuated forward brake 62 and a hydraulically actuated reverse brake 64. When the transmission produces forward drive, brake 62 is engaged and brake 64 is disengaged. When the transmission produces reverse drive, brake 64 is engaged and brake 62 is disengaged.

The forward brake 62 includes friction discs 66, splined at their inner radial surface to a drum 68; plates 70, splined at their outer radial surface to casing 60, each plate 70 alternating with a disc 66; a pressure plate 72, splined at its outer radial surface to casing 60; a snap ring 74 secured to the casing 70 against displacement along an axis 76 and located adjacent pressure plate 72; a piston 78 that moves along axis 30 in response to hydraulic pressure in the cylinder 80, in which piston 78 is located; and a Belleville spring 82, fitted in a recess adjacent a snap ring 84 that is secured to casing 70 and contacting the piston 78. When cylinder 80 is pressurized, piston 78 moves leftward and forces the friction discs 66 and plates 70 into mutual frictional contact against pressure plate 72. Spring 82 returns piston 78 to the disengaged position shown in FIG. 2, when pressure in the cylinder 80 is vented.

The reverse brake 64 includes friction discs 86, splined at their inner radial surface to an extension 88 that projects from the inner race 22 of clutch 20; plates 90, splined at their outer radial surface to casing 60, each plate 90 alternating with a disc 86; a pressure plate 92, splined at its outer radial surface to casing 60; a snap ring 94 secured to the casing 70 against displacement along axis 30 and located adjacent a plate 90; a piston 98 that moves along axis 30 in response to hydraulic pressure in a servo cylinder, in which piston 98 is located; and a Belleville spring 100, fitted in a recess adjacent a snap ring 102 that is secured to casing 70 and contacts the piston 98. When the servo cylinder is pressurized, piston 98 moves rightward and forces the friction discs 86 and plates 90 into mutual frictional contact. The force of piston 98 is transmitted by the friction discs 86, plates 90, and the outer race 24 of one-way clutch 20, and snap ring 74 to casing 60. Spring 100 returns piston 98 to the disengaged position shown in FIG. 2, when pressure in the servo cylinder is vented.

Snap ring 94 does not participate in transmitting to casing 60 the force of piston 98 that causes engagement of reverse brake 64. Snap ring 94 prevents one-way clutch 20 from transmitting to reverse brake 64 an axial thrust force from carrier 110 when brake 64 is disengaged.

The outer race 24 of clutch 20 is connected by spline teeth 54 to casing 60, and the extension 88 of the inner race 22 is driveably connected by spline teeth 56 to spline teeth on the carrier 110 of a planetary gear set that includes a ring gear 112. Each pocket containing a rocker 26 is closed by an end plate 114. A snap ring 116 is secured to outer race 24 and is located adjacent the end plate 114. The end face 118 of the outer race 24 is located for contact with either a friction plate 86 or a disc 90, whichever is adjacent face 118.

Pressure plate 72 and snap ring 74 transmit to casing 60 the reaction to the pressure force applied by piston 78 to the discs 66 and plates 70.

The outer race 24 of reverse clutch 20 always floats while clutch 20 is overrunning when the transmission produces forward drive, so that race 24 can find its centerline. Reverse clutch 20 contacts snap ring 74, which is secured to casing 60. Therefore, clutch 20 resists and reacts the actuating force transmitted by piston 98 to the friction discs 86 and plates 90 of reverse brake 64. It is acceptable that clutch 20 reacts the pressure force applied to reverse brake 64 because in reverse drive, clutch 20 is not overrunning, there is no relative movement between inner race 22 and outer race 24, and no wear is produced between races 22, 24.

In accordance with the provisions of the patent statutes, the preferred embodiment has been described. However, it should be noted that the alternate embodiments can be practiced otherwise than as specifically illustrated and described.

The invention claimed is:

1. An assembly for an automatic transmission comprising:
   a casing;
   a carrier of a planetary gearset;
   a friction brake for opening and closing a connection between the carrier and the casing;
   an overrunning brake including an outer race connected to the casing, an inner race, rockers on the inner race that engage and disengage the outer race, a spline engaged by the friction brake, and a second spline engaged by the carrier.

2. The assembly of claim 1, further comprising:
   a second friction brake that driveably connects the casing and a component of the transmission other than the carrier when the second brake is engaged in forward drive and disconnects the carrier from the casing when the brake is disengaged in reverse drive.

3. The assembly of claim 1, wherein the overrunning brake further comprises:
   cams on the outer race angularly spaced about an axis, the inner race includes pockets angularly spaced about the axis, each rocker being located in a pocket, and springs supported on the inner race, each spring urging a rocker toward engagement with the cams.

4. The assembly of claim 1, wherein the carrier is formed with external spline teeth and the-second spline includes internal spline teeth that are engaged with the external spline teeth.

5. The assembly of claim 1, wherein the friction brake further comprises:
   friction discs driveably connected to the inner race;
   plates driveably connected to the casing, each plate alternating with a disc;
   a cylinder;
   a piston that moves along the axis toward engagement with the discs and plates in response to an actuating force due to hydraulic pressure in the cylinder, the force being resisted by the overrunning brake; and
   a spring that urges the piston away from engagement with the discs and plates.

6. The assembly of claim 1, wherein the friction brake driveably connects the carrier and the casing mutually when the brake is engaged in reverse drive and disconnects the carrier from the casing when the brake is disengaged.

7. The assembly of claim 1, wherein:
   the spline is located at a radially outer surface of the inner race; and
   the second spline is located at a radially inner surface of the inner race.

8. The assembly of claim 1, wherein the friction brake further comprises interleaved discs and plates, one of the discs and plates being engaged with the spline.

9. The assembly of claim 1, wherein the friction brake is hydraulically actuated.

10. The assembly of claim 1, wherein the overrunning brake further comprises:
   a third spline connecting the outer race to the casing;
   the rockers are supported on and engaged with the inner race; and
   the outer race is formed with cams engageable with and disengageable from the rockers.

11. An assembly for an automatic transmission comprising:
   a casing;
   a carrier of a planetary gearset;
   a friction brake for opening and closing a connection between the carrier and the casing, including alternating discs and plates;
   an overrunning brake including an outer race connected to the casing, an inner race, rockers on the inner race that engage and disengage the outer race, a spline engaged by the discs, and a second spline engaged by the carrier.

12. The assembly of claim 11, further comprising:
   a second friction brake that driveably connects the casing and a component of the transmission other than the carrier when the second brake is engaged in forward drive and disconnects the carrier from the casing when the brake is disengaged in reverse drive.

13. The assembly of claim 11, wherein:
   cams on the outer race angularly spaced about an axis, the inner race includes pockets angularly spaced about the axis, each rocker being located in a pocket, and springs supported on the inner race, each spring urging a rocker toward engagement with the cams.

14. The assembly of claim 11, wherein the carrier is formed with external spline teeth and the second spline includes internal spline teeth that are engaged with the external spline teeth.

* * * * *